(12) United States Patent
Trempala

(10) Patent No.: US 6,553,795 B1
(45) Date of Patent: Apr. 29, 2003

(54) LOCKING COVER PLATE ARRANGEMENT

(75) Inventor: Dohn J. Trempala, Corona del Mar, CA (US)

(73) Assignee: Knox Company, Irvine, CA (US)

( * ) Notice: Subject to any disclaimer, the term of this patent is extended or adjusted under 35 U.S.C. 154(b) by 40 days.

(21) Appl. No.: 09/651,753

(22) Filed: Aug. 30, 2000

Related U.S. Application Data

(60) Provisional application No. 60/151,403, filed on Aug. 30, 1999.

(51) Int. Cl.$^7$ ............................................. B65D 55/14
(52) U.S. Cl. ............................ 70/167; 70/169; 70/432; 137/296
(58) Field of Search ........................... 70/163–169, 432, 70/416, 417; 137/296; 403/370, 371

(56) References Cited

U.S. PATENT DOCUMENTS

| | | | | |
|---|---|---|---|---|
| 737,667 A | * | 9/1903 | Schunck | |
| 1,161,158 A | * | 11/1915 | Rennert | 70/432 X |
| 1,349,610 A | * | 8/1920 | Gibney | |
| 1,362,647 A | * | 12/1920 | Strone et al. | 70/432 X |
| 2,283,371 A | | 5/1942 | Johnson | 70/168 |
| 2,315,102 A | * | 3/1943 | Adams | 70/432 |
| 2,565,669 A | * | 8/1951 | Smith | 70/432 X |
| 2,777,353 A | | 1/1957 | Willis | 411/403 |
| 3,136,148 A | * | 6/1964 | Nehls | 70/169 |
| 3,914,966 A | * | 10/1975 | Bello | 70/163 |
| 3,915,335 A | * | 10/1975 | Shanklin et al. | 70/169 X |
| 4,141,574 A | | 2/1979 | Stansifer et al. | 285/92 |
| 4,172,606 A | | 10/1979 | Howe | 285/34 |
| 4,182,361 A | | 1/1980 | Oakey | 137/296 |
| 4,184,516 A | | 1/1980 | Oesterritter et al. | 138/96 R |
| 4,351,446 A | | 9/1982 | Madden | 220/210 |
| 4,526,193 A | | 7/1985 | Drach | 137/296 |
| 4,566,481 A | | 1/1986 | Leopold, Jr. et al. | 137/296 |
| 4,602,654 A | * | 7/1986 | Stehling et al. | 137/296 |
| 4,633,896 A | | 1/1987 | Bainbridge et al. | 137/296 |
| 4,651,771 A | | 3/1987 | Borenstein et al. | 137/296 |
| 4,674,306 A | * | 6/1987 | Halpern | 70/167 X |
| 5,033,501 A | * | 7/1991 | Stehling | 137/296 |
| 5,072,750 A | * | 12/1991 | Poms et al. | 137/296 |
| 5,383,495 A | * | 1/1995 | Kennedy | 137/296 X |
| 5,549,133 A | * | 8/1996 | Sigelakis | 137/296 |
| 5,632,301 A | * | 5/1997 | Julicher | 137/296 |
| 5,803,110 A | | 9/1998 | Segal | 137/68.14 |
| 5,904,057 A | * | 5/1999 | Abney, III et al. | 70/167 |
| 6,044,670 A | * | 4/2000 | Citurs et al. | 70/169 |
| 6,070,442 A | * | 6/2000 | Neeley et al. | 70/432 X |
| 6,089,253 A | * | 7/2000 | Stehling et al. | 137/296 |
| 6,112,761 A | * | 9/2000 | Scotto | 137/296 |
| 6,199,414 B1 | * | 3/2001 | Chang | 70/168 |
| 6,340,933 B1 | * | 1/2002 | Chen et al. | 70/432 X |

* cited by examiner

*Primary Examiner*—Suzanne Dino Barrett
(74) *Attorney, Agent, or Firm*—Knobbe, Martens, Olson & Bear, LLP

(57) ABSTRACT

A locking cover plate can be selectively locked in position on a stortz pipe end fitting or can be unlocked and removed for access to the open pipe end. The cover plate includes a sliding plate that is driven laterally outward into a deployed state by rotating a drive bolt. The drive bolt is coupled to the sliding plate through a torque limiting coupling that transfers the rotation of the drive bolt to translating movement of the latch bar with a cam plate. Movement of the sliding plate is indicated through a front of the cover plate such that the user can identify whether the cover plate is locked on a fitting or simply placed on the fitting without the lock engaged.

14 Claims, 9 Drawing Sheets

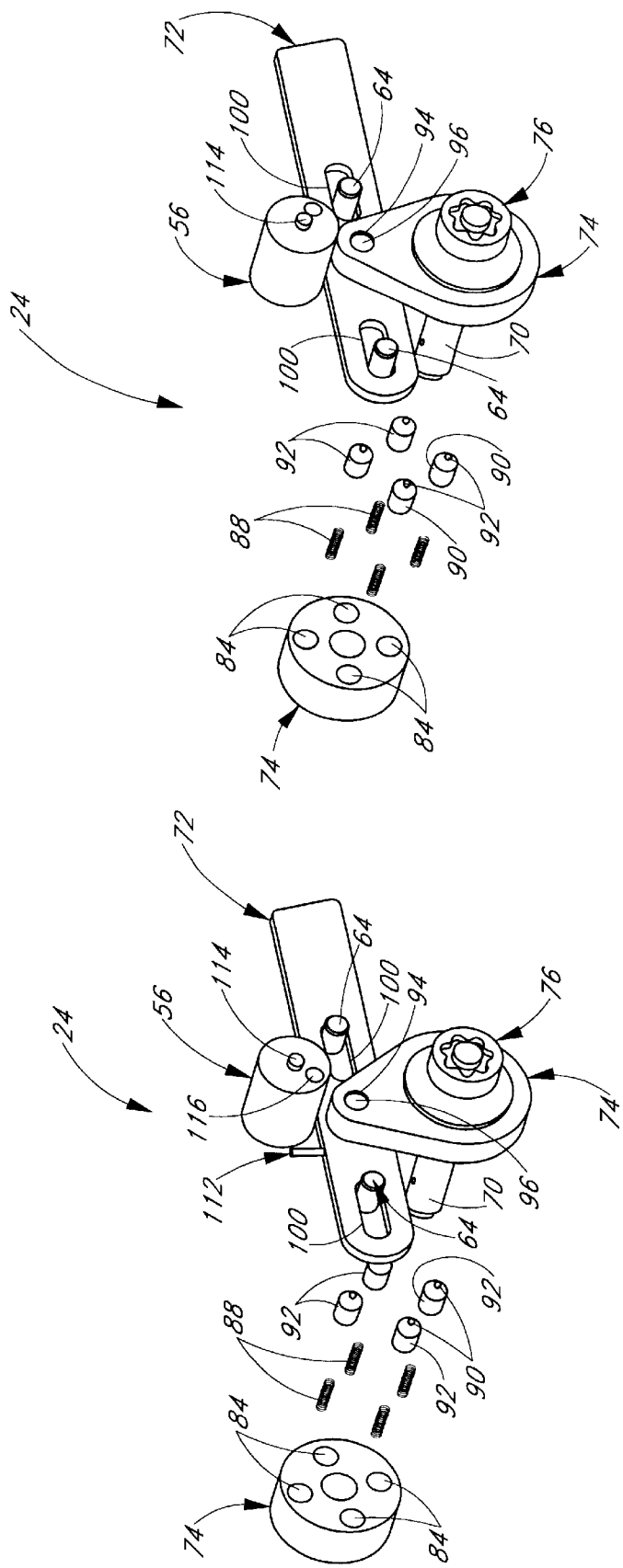

LOCKING COVER PLATE ARRANGEMENT

RELATED APPLICATIONS

The present application claims priority from U.S. Provisional Application No. 60/151,403, filed on Aug. 30, 1999, which is hereby incorporated by reference.

BACKGROUND OF THE INVENTION

1. Field of the Invention

The present invention generally relates to locking cover plates for open ends of plumbing components. More specifically, the present invention relates to protective locking cover plates for fire retardant sprinkler systems having a stortz-type coupling arrangement.

2. Related Art

In fire retardant automatic sprinkler systems having multiple sprinkler heads, the standing water supply often is insufficient to maintain optimum operating water pressure when there are several sprinkler heads in simultaneous use. Accordingly, the National Fire Protection Association Code requires a connection, such as a stand pipe connection, through which a fire department can pump water into the sprinkler system. The pumped water is used to charge or recharge the sprinkler system as desired.

Where such stand pipe connections are provided, upon arrival of fire department personnel, an auxiliary source of water such as a hose supplied with water from a fire truck pump can be connected to the sprinkler system. Increasingly, stortz-type connectors are used to facilitate the connection. Stortz-type connectors provide a particularly advantageous manner of rapidly connecting and disconnecting hoses to a stand pipe, for instance. The stortz-type connector generally features a pair of arcuate slots with enlarged insertion openings. The slots are formed on a circular flange. The enlarged insertion openings receive mounting pins or feet from a mating fitting. The pins are inserted into the slots and rotated about a quarter-turn relative to the stationary fitting to couple the two components together.

The National Fire Protection Association Code also specifies that such hose connections shall be equipped with caps, plugs or cover plates. Because the hose connections are in public locations, which can be unsecured, the cover plates desirably reduce the likelihood of tampering by passersby, vandals or arsonists. Thus, the cover plates cover the auxiliary water inlet to prevent the inadvertent or malicious introduction of trash or other debris that might clog the sprinkler system during operation of the sprinkler system in an emergency.

Several types of caps, plugs and cover plates have heretofore been provided to cover the connection. These caps, plugs or plates are provided to protect the integrity or operability of the sprinkler system. One such arrangement includes a plate with inwardly extending pins. The cover plate mates with the stortz fitting and the cover plate is secured by sliding the pins through the slots and rotating the cover plate. The cover plate must be capable of quick removal in case of an emergency. Thus, the cover plate generally is not locked to the fitting and has not been suitably secured against unauthorized removal. As a result, the plate is susceptible to unauthorized removal, theft and vandalism.

SUMMARY OF THE INVENTION

Accordingly, a locking cover plate is desired for a stand pipe having a stortz fitting. The plate should be capable of easy-removal by authorized personnel while being difficult to remove if unauthorized. Additionally, the plate preferably provides visual confirmation of whether or not the lock has been engaged. Furthermore, the plate preferably is substantially weather-impervious and capable of removal under extreme climatic and environmental conditions by emergency personnel that are under high anxiety and time pressure.

One feature of the present invention takes advantage of characteristics of a bolt featuring a specially designed bolt head. The bolt is commonly used in applications that involve securing two components together and reducing the likelihood of removal. In addition, the bolt is difficult to damage due to its construction. In use, the bolt is tightened with a special driver that mates with the bolt head. The driver preferably is not readily available on the market. The pattern on the bolt head makes difficult generating high degrees of torque on the bolt. Accordingly, generating sufficient torque to remove the bolt generally requires the special driver. This feature is combined with an interference member lock device (i.e., a bayonet-type of lock). Typical bayonet-type locks feature a keyed entry such that a typical lock cylinder and key arrangement is used to open and close the lock. The cylinder and key arrangement is susceptible to vandalism or damage. Due to the particular environments and industries in which the present invention generally will be used, a combination of these two components was developed. The combination results in an interfering lock that is selectively deployed through turning the bolt. The bolt, however, can be tightened to generate a locking friction force that is difficult to overcome without the corresponding driver and the bolt is difficult to damage or destroy.

Thus, one aspect of the present invention involves a locking cover plate for an open pipe end having a stortz-type fitting. The cover plate comprises a housing having a front surface and a generally cylindrical side surface. An actuator assembly is substantially contained within the housing. The actuator assembly comprises a drive bolt extending rearward from the front of the housing. A cam plate is connected to the drive bolt and a torque limiting assembly selectively couples the cam plate to the drive bolt. The cam plate is capable of rotating relative to the drive bolt when coupled by the torque limiting assembly to the drive bolt and the cam plate is capable of translating relative to the bolt when not coupled by the torque limiting assembly to the drive bolt. A latch bar is connected to the cam plate and is disposed for translation generally normal to an axis that extends through the drive bolt. An indicator assembly is connected to the latch bar.

Another aspect of the present invention involves a protective cover plate for a stortz connection of a piping system. The cover plate comprises a front plate and a stortz fitting extending rearward from the front plate. A sliding plate locking mechanism is disposed rearward of the front plate and is adapted to engage a concealed portion of the piping system when the cover plate is assembled to the piping system.

A further aspect of the present invention involves a method of installing a cover plate to a piping system having a stortz fitting. The method comprises inserting the cover plate into the stortz fitting, rotating the cover plate to secure the cover plate to the stortz fitting, turning a cam plate, translating a latch bar, indicating a movement of the latch bar, and loading an actuator assembly with a tamper-resistant torsion load.

Another aspect of the present invention involves a method of removing a cover plate from a piping system having a stortz fitting. The method comprises unloading a tamper-resistant torsion load, rotating a cam plate, translating a latch bar, indicating movement of the latch bar and removing the cover plate.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIGS. 5A and 5B are front perspective views of the latch mechanism and torque limiting assembly with a cam driver and associated pins and springs shown exploded from the balance of the assembly, with FIG. 5A showing the latch mechanism in an undeployed-state and FIG. 5B showing the latch mechanism in a deployed-state;

DETAILED DESCRIPTION OF THE PREFERRED EMBODIMENTS OF THE INVENTION

Figure 1:
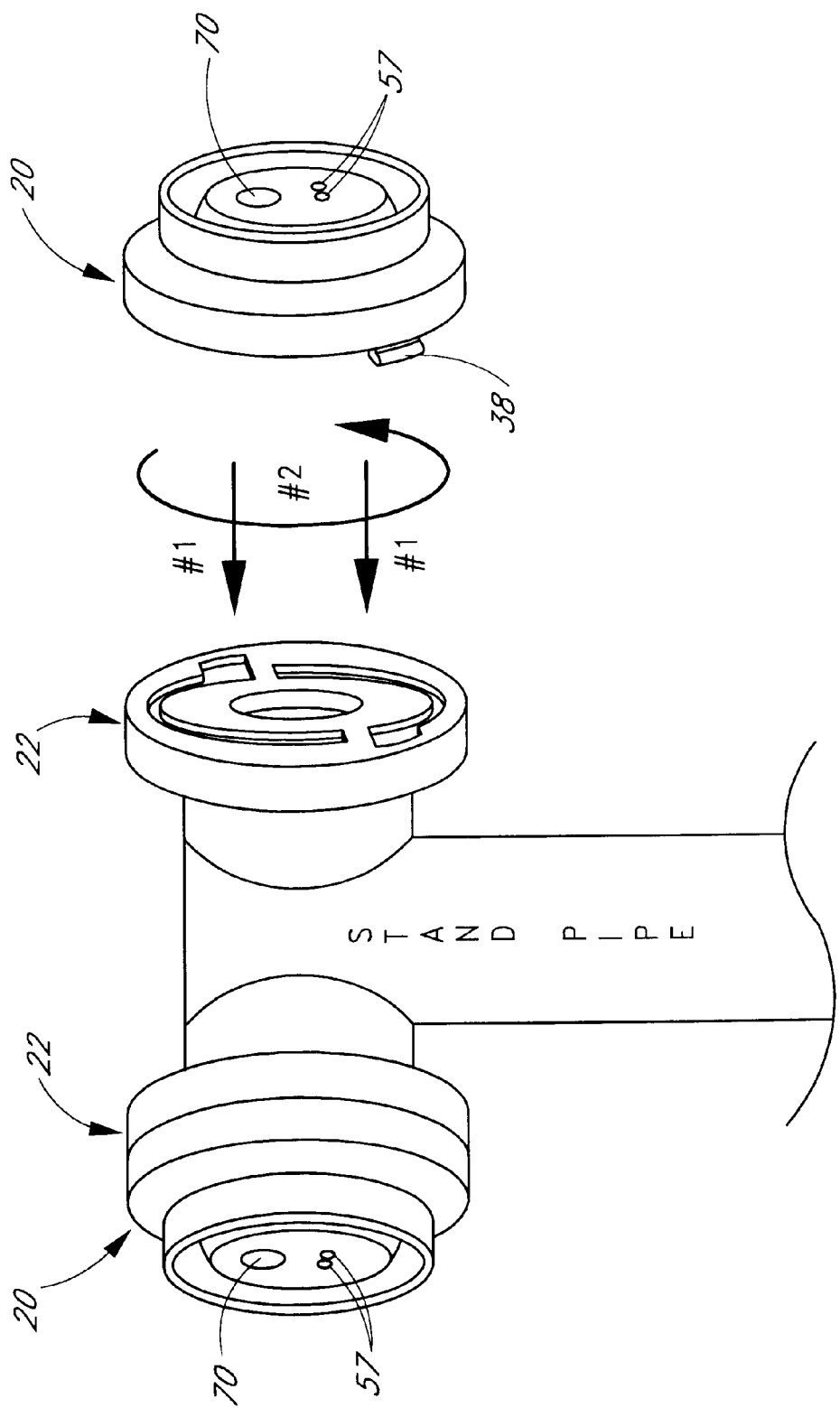
FIG. 1 is a front perspective illustration of an exemplary standpipe connection having a locking plate configured according to certain aspects of the present invention and illustrating a locking plate removed from the stortz fitting.

With reference now to FIG. 1, a pair of locking plates 20 that are arranged and configured in accordance with certain features, aspects and advantages of the present invention are illustrated connected to a standpipe arrangement having a pair of stortz-type fittings 22. While the present invention will be described in the context of a sprinkler system for a fire protection system, it should be recognized that certain features, aspects and advantages of the present invention also can be used in other industries. For instance, the locking plate 20 can also be used with plumbing connectors in the petrochemical industry, the pharmaceutical industry, the chemical industry, the food industry and the dairy industry, for instance.

The present locking plate 20 is particularly designed to reduce unauthorized access to open ended pipes. In particular, the present locking plate 20 has been designed to reduce unauthorized access to standpipes for sprinkler systems. Generally, the present locking plate 20 has particular utility in applications that feature a separate water-stopping valve or mechanism although the present locking plate 20 could be readily adapted to form a liquid-tight seal.

With reference to now FIG. 2, several of the components of the locking plate 20 will be described in detail. In general, the locking plate 20 comprises a latching mechanism 24 and a housing 26. The housing 26 advantageously forms a protective mounting platform for the latching mechanism 24. In the illustrated arrangement, the housing 26 is comprised of a stortz-type adapter ring 30, a plug 32, a back plate 34 and a camlock cover 36. Together, these components form a protective enclosure that contains the latching mechanism 24 of the illustrated arrangement. Preferably, the adapter ring 30 and the front of the plug 32 are the sole components of the housing that are disposed outside of the pipe when the locking plate 20 is secured in position on the pipe.

Figure 2:
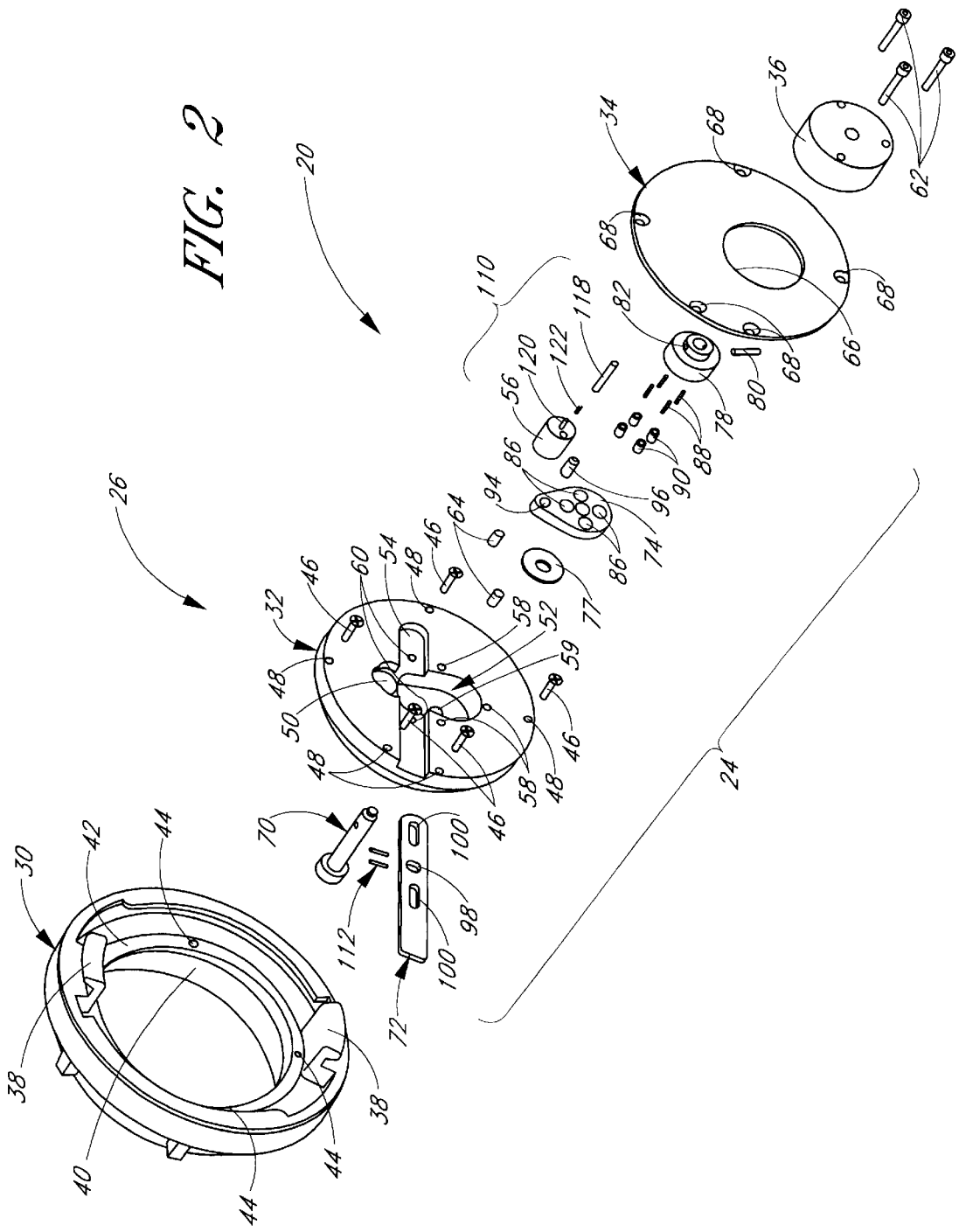
FIG. 2 is an exploded perspective view of a locking plate arranged and configured in accordance with certain features, aspects and advantages of the present invention.
Figures 3A, 3B:
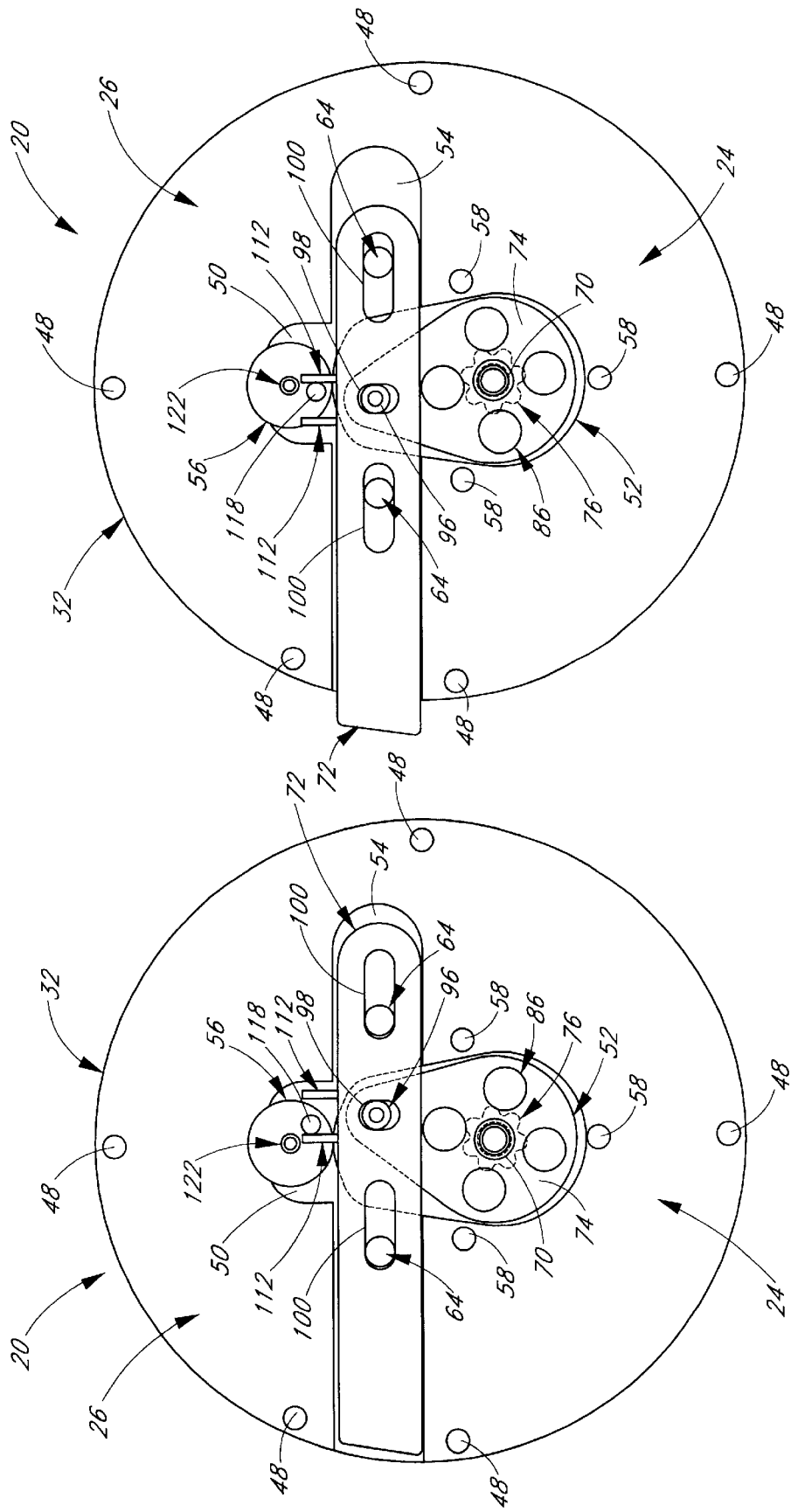
FIGS. 3A and 3B are rear elevation views of a latch mechanism for the locking plate, with FIG. 3A showing the latch mechanism in an undeployed-state and FIG. 3B showing the latch mechanism in a deployed-state.
Figure 4B:
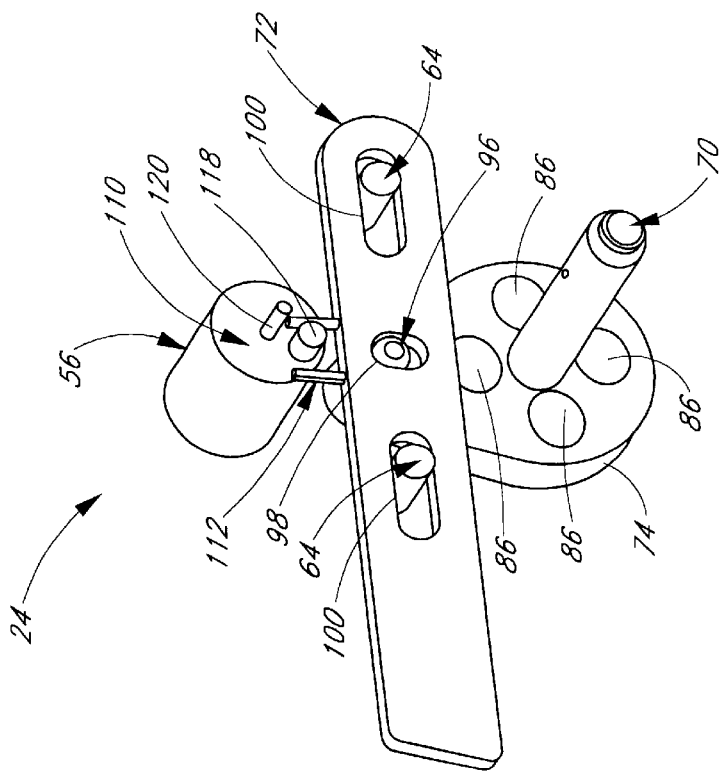
FIGS. 4A and 4B are rear perspective views of a torque limiting assembly of the locking plate, with FIG. 4A showing the latch mechanism in an undeployed-state and FIG. 4B showing the latch mechanism in a deployed-state.
Figure 4A:
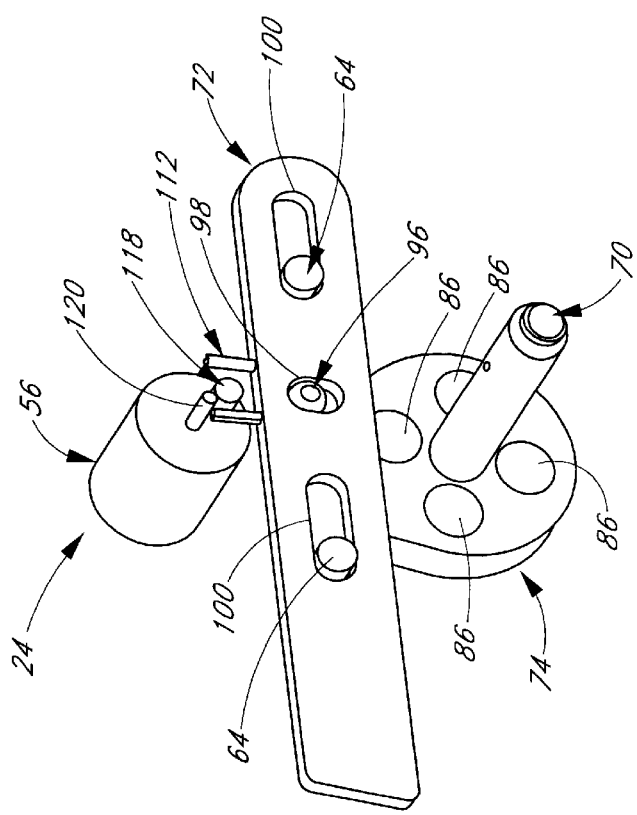
Figure 6:
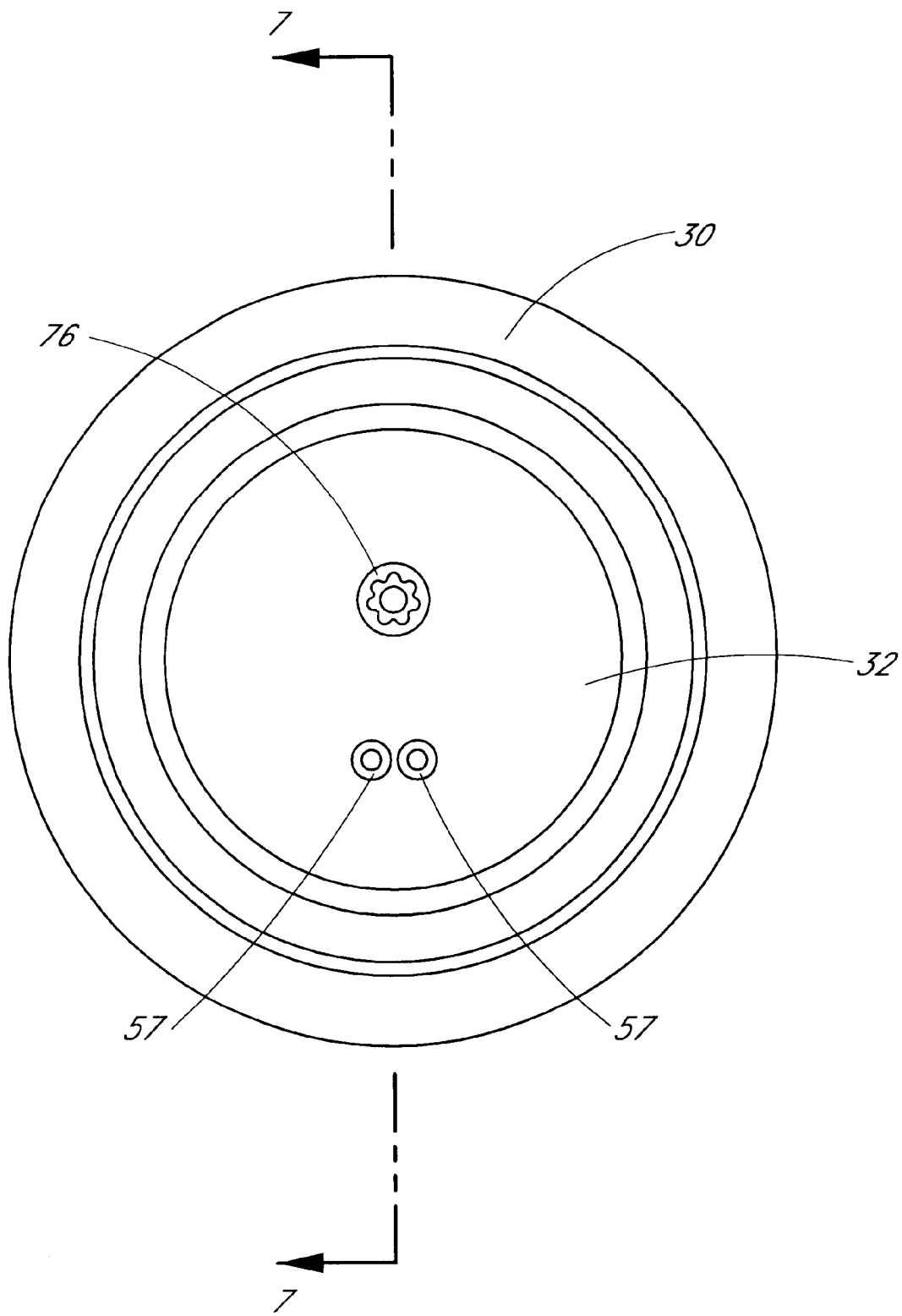
FIG. 6 is a front elevation view of the locking plate.
Figure 7:
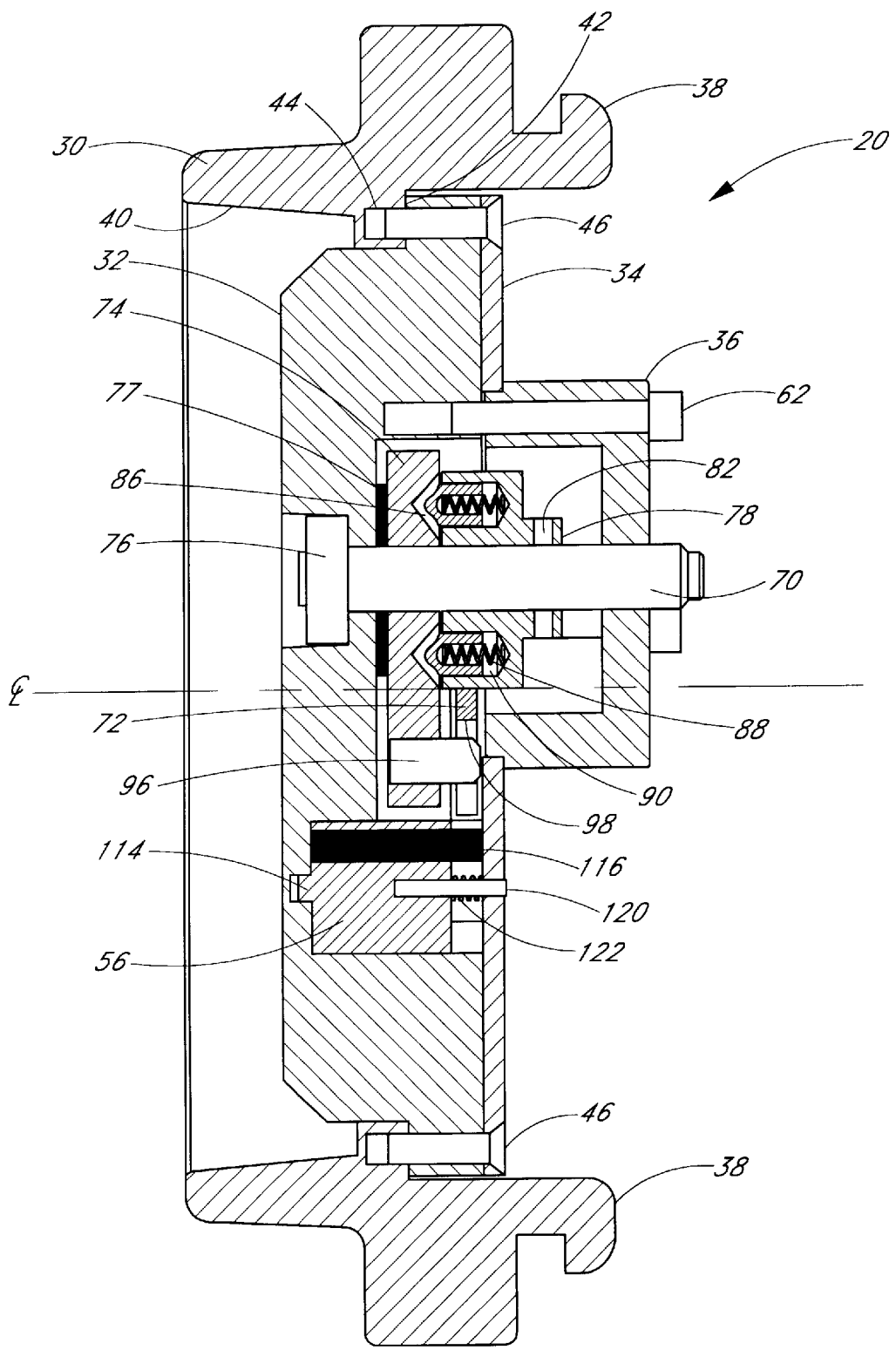
FIG. 7 is a sectioned side view of the locking plate.

With continued reference to FIG. 2, the adapter ring 30 comprises a pair of opposing flanges 38. The flanges 38 define a pair of outwardly disposed catch hooks. As is known, the flanges 38 are sized for insertion into entrance slots formed in a stortz fitting. The flanges 38 also are sized to slide within a pair of circumferential grooves that are formed in the stortz fitting and that extend from the entrance slots. The adapter ring 30 can be made from aluminum, brass or any other suitable material. Preferably, the adapter ring 30 is made from a weather-resistant material that will not easily degrade.

The adapter ring 30 can comprise a wall 40 that defines a generally central aperture. The illustrated wall 40 is inset from an outer diameter of the adapter ring 30 and preferably extends only a portion of the thickness of the adapter ring 30. In the illustrated arrangement, the wall 40 has a thickness that defines a mounting face 42. The mounting face 42 preferably includes a number of internally-threaded blind holes 44. In the illustrated arrangement, the blind holes 44 receive corresponding threaded fasteners 46 to secure the plug 32 to the adapter ring 30. Of course, the plug 32 can be mounted to the adapter ring 30 in any suitable manner. For example, but without limitation, the two components can be secured together with clips, pins, threads, brazing and the like.

With continued reference to FIG. 2, the plug 32 preferably is manufactured from aluminum or brass and preferably contains a number of structures that are cut or otherwise formed. In the presently preferred arrangement, the plug 32 is anodized aluminum. As illustrated, the plug 32 also can contain a number of through holes 48 that receive the threaded fasteners 46. The holes 48 desirably are positioned in alignment with the blind holes 44 formed in the adapter ring 30.

The illustrated plug 32 also contains an indicator recess 50, an actuator recess 52 and a latch bar channel 54. The indicator recess 50 preferably is sized and configured to allow relatively free movement of an indicator drum 56, which will be described below. Additionally, a pair of indicator windows 57 preferably extend through the wall of the indicator recess 50 such that at least a portion of the indicator drum 56 can be viewed from the front of the plug 32 (see FIG. 1).

The actuator recess 52 and the latch bar channel 54 are sized and configured to allow generally free movement of the respective components, which will be described below. The actuator recess comprises a through hole 59 that accommodates a portion of the latching mechanism 24, which also will be described below.

The illustrated plug 32 also contains a number of other internally-threaded blind holes 58 that are spaced around the actuator recess 52 and a pair of blind holes 60 that are formed in the channel 54. The threaded holes 58 in the illustrated arrangement receive a set of corresponding threaded fasteners 62 to attach the camlock cover 36 to the plug 32. Of course, the camlock cover 36 can be secured to the plug 32 in other manners; however, using the threaded fasteners 62 facilitates maintenance, if necessary, while also reducing the likelihood of tampering due to the amount of effort required to remove and replace the cover 36. The camlock cover 36 preferably is manufactured from aluminum and includes a small step to allow the camlock cover 36 to properly seat on the back plate 34.

The blind holes 60 hat are formed in the plug 32 receive a set of corresponding pins 64. The pins 64 in the illustrated arrangement are positioned along a centerline of the channel 54. While other locations within the channel 54 are possible, it will be understood that both of the pins 64 should be spaced substantially the same distance from a single wall of the channel 54.

As described above, the housing 26 also comprises the back plate 34. The illustrated back plate 34 is manufactured from aluminum and contains a hole 66. The hole 66 accommodates some of the latching mechanism components and allows the size of the plug 32 to be decreased. More particularly, the back plate 34 works in cooperation with the camlock cover 36 to form a closing arrangement that allows the depth of the plug 32 to be decreased while still enclosing the moving components of the plate 20. The back plate 34 in the illustrated arrangement is secured with the threaded fasteners 46, which preferably extend through a corresponding set of holes 68. In the illustrated arrangement, the holes 68 are countersunk; however, in some arrangements, the holes will not be countersunk and can be flush or counterbored. In addition, as described above, other suitable methods can be used to secure the back plate 34 in position relative to the plug 32.

The latching mechanism 24 comprises an actuator assembly and a torque interlock assembly. The actuator assembly and the torque interlock assembly cooperate to lock and unlock the illustrated locking plate 20 and the standpipe 22. The actuator assembly generally comprises a drive bolt 70, a latch bar 72 and a cam plate 74. The drive bolt 70 can be any suitable type and configuration. In the illustrated arrangement, the drive bolt 70 comprises a bolt having a specially patterned head 76 (see FIGS. 5A and 5B). The specially patterned head 76 features a groove configuration that matches a mating driver socket formed on a cooperating key. This configuration is described and illustrated in application Ser. No. 29/110,116, filed Aug. 31, 1999 and Ser. No. 09/247,665, filed Feb. 9, 1999, which are hereby incorporated by reference in their entirety. In addition, a presently preferred key assembly is fully disclosed in those applications.

The drive bolt 70 extends through the hole 59 in the plug 32 at a location generally below the latch bar 72. It should be noted that relative directions such as above and below are for ease of reference and form no limitation on the scope of the present invention unless particulary noted. The drive bolt 70 also extends through a biasing member 77, the cam plate 74 and at least a portion of a cam driver 78. The biasing member 77 preferably is a star washer or a Belleville washer. Preferably, the biasing member 77 can increase the frictional resistance to turning such that approximately 10–30 foot pounds of torque is required to turn the drive bolt 70 once tightened. In some arrangements, the biasing member 77 increases the resistance to turning such that approximately 15 foot pounds of torque is required to loosen the drive bolt 70 once tightened. The cam plate 74 and the cam driver 78 preferably are manufactured from hard brass. In addition, the latch bar 72 preferably is manufactured from hard brass. These material selections decrease the likelihood of galling of the components. Of course, other lubricious material selections also can be made; however, the selected materials result in improved wear properties.

The cam driver 78 preferably is pinned in position on the drive bolt 70 with a pin 80. In the illustrated arrangement, the cam driver 78 and the cam plate 74 form an interconnecting portion of both the actuator assembly and the torque interlock. The illustrated cam driver 78 has a stepped configuration with the pin 80 extending through a radial hole 82. The cam driver 78, thus, is joined to the drive bolt 70 for rotation and the cam driver 78 does not rotate a substantial amount relative to the drive bolt 70. In some arrangements, a jam nut or a pair of jam nuts can be used to secure the cam driver 78 in position on the drive bolt 70. Of course, other suitable connections also can be used. For instance, but without limitation, the cam driver 78 can be welded, brazed, cross-threaded or otherwise connected to the drive bolt 70.

With reference now to FIGS. 5A and 5B, the illustrated cam driver 78 preferably comprises a number of holes 84 disposed in an axial face (i.e., the holes 84 have centerlines that are generally parallel to the axis of rotation of the drive bolt 70. The holes are positioned relative to a number of corresponding holes 86 formed in the cam plate 74. While the same number of holes are placed in both components, the two sets of holes can have differing numbers so long as the holes can match at particular intervals (i.e., 3 holes and 6 holes with the 3 holes mating with 3 holes of the 6 holes).

The holes 84 preferably accommodate a biasing member 88 (i.e., a compression spring) and a locking pin 90. The biasing member 88 urges the locking pin 90 toward the cam plate 74 such that the locking pin 90 slides over the facing surface of the cam plate 74 or into the corresponding holes 86 depending upon the relative locations of the components. For this reason, the locking pin 90 preferably has a ride surface 92 that is rounded or conical in shape. Additionally, the holes 86 formed in the cam plate 74 preferably are conical or rounded to allow the locking pin 90 to slip into and out of the holes 86. In the illustrated arrangement, the holes are conical and do not comprise a cylindrical portion.

The use of the biased pins 90 creates a torsion interlock. The torsion interlock forms a slip connection such that exceeding a preset torque causes the cam plate 74 and the cam driver 78 to disengage. In addition, as will be explained, if the pins 90 are not sufficiently biased into the cam plate 74, the cam driver 78 and the cam plate 74 do not engage with enough axial force to transmit radial forces. Thus, the relative spacing between the cam driver 78 and the cam plate 74 interplays with the amount of torque that can be transferred between the two components.

The cam plate 74 generally comprises a water drop profile in the illustrated arrangement. The holes 86 are spaced about the centerline of the central hole through which the drive bolt 70 extends. In the illustrated arrangement, the drive bolt 70 and the cam plate 74 are threadedly connected such that rotation of the drive bolt 70 can result in axial movement of the cam plate 74. The tapered portion of the cam plate preferably comprises another through hole 94, which has a central axis that is offset from the centerline of the central hole. The off-center hole 94 receives a drive pin 96. The drive pin 96 extends into a generally vertical slot 98 formed in the latch bar 72. This arrangement allows the drive pin 96 to reciprocate the latch bar 72 in a transverse direction. Of course, the rotational movement of the cam plate 74 about the drive bolt 72 will tend to cause movement of the pin 96 relative to the latch bar 72 in two axes. Thus, the slot 98 allows for lost motion in one axis while the drive pin 96 urges the latch bar 72 along the other axis. The pins 64, which are positioned within a set of generally horizontal slots 100 that are formed in the latch bar 72, generally define the axis along which the latch bar 72 translates. Of course, as used herein, vertical and horizontal are for reference purposes only and these directional identifiers should not be construed as limiting on the present invention.

With reference again to FIG. 2, the locking plate 20 preferably comprises an indicator assembly 110. The indicator assembly desirably cooperates with the windows 57 to indicate whether the latch bar 72 is in an unlocked position or a locked position. In the illustrated arrangement, the latch bar 72 includes a pair of pins 112 that extend from a side surface of the latch bar 72. The pins 112 define a lateral range of motion for the indicator assembly 110.

With continued reference to FIG. 2, the indicator assembly 110 further comprises the indicator drum 56. In the illustrated arrangement, the indicator drum 56 is manufactured from black delrin. The indicator drum 56 preferably comprises a central pin 114 that is disposed along the axis of rotation for the indicator drum 56. In addition, an indicator pin 116 preferably is embedded within the drum 56. The indicator pin 116 advantageously aligns with one of the windows 57 depending upon the rotational orientation of the drum 56. Moreover, the indicator pin in the illustrated arrangement is manufactured from white nylon, which advantages contrasts with the black delrin indicator drum 56.

The drum 56 also features a drive pin 118. The drive pin 118 is positioned off of the center axis and between the pins 112 of the latch bar 72. Movement of the latch bar 72 urges one of the pins 112 against the drive pin 118. The drive pin 118 drives the drum 56 about its central axis and converts the axial movement of the latch bar 72 into rotational movement of the indicator drum 56.

The illustrated arrangement also features an axle 120 that extends through a portion of the back plate 34. In such an arrangement, a biasing member 122, such as a compression spring, for instance, is used to bias the drum 56 into an appropriate axial location. The biasing member 122 also creates a small degree of friction between the drum 56 and the plug 32 such that the drum 56 does not freely turn relative to the plug 32. Moreover, by forwardly biasing the drum 56 toward the window 57, the ingress of dirt, dust, sand and other debris can be significantly reduced. Such an arrangement advantageously improves the life span of the locking plate 20.

Figure 8A:
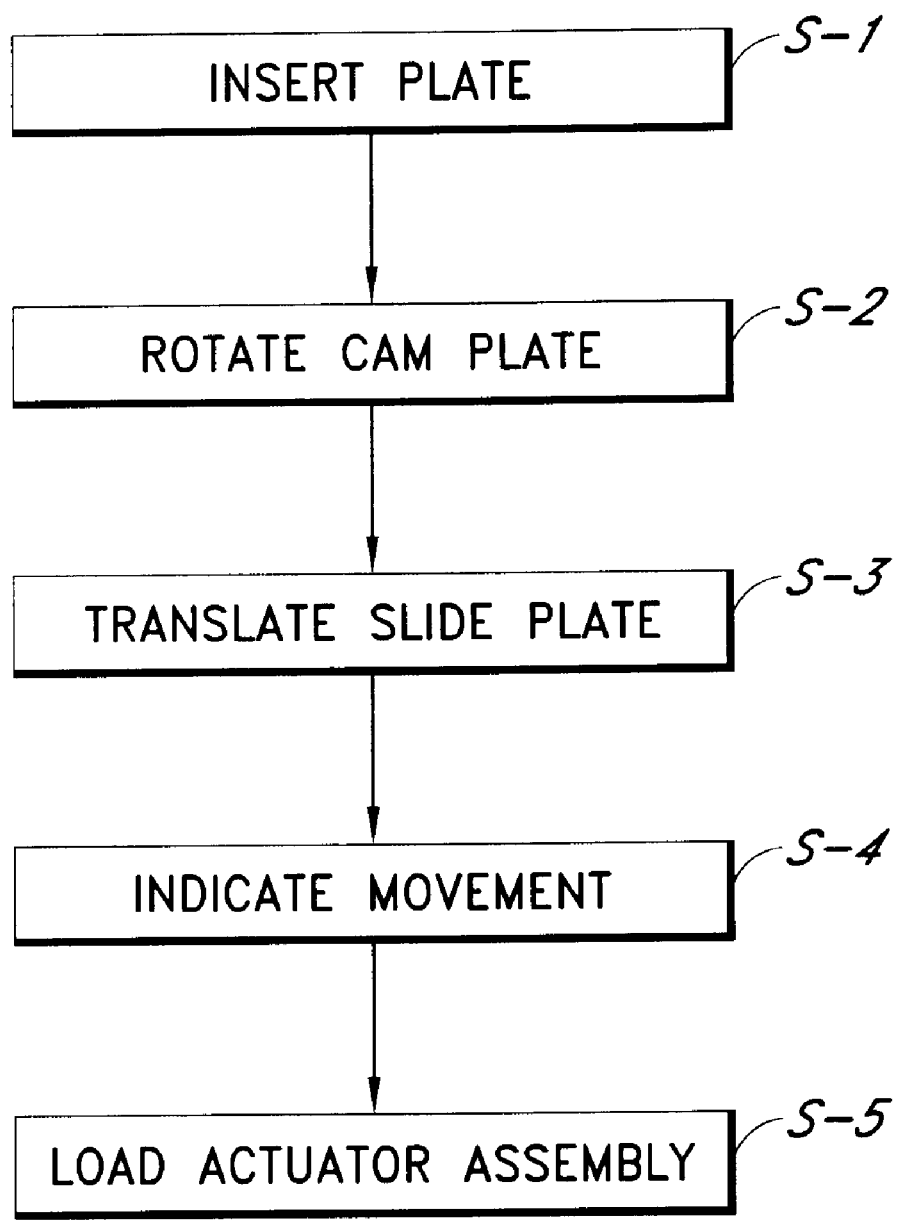
FIG. 8A is an exemplary flow chart summarizing a preferred securing process.
Figure 8B:
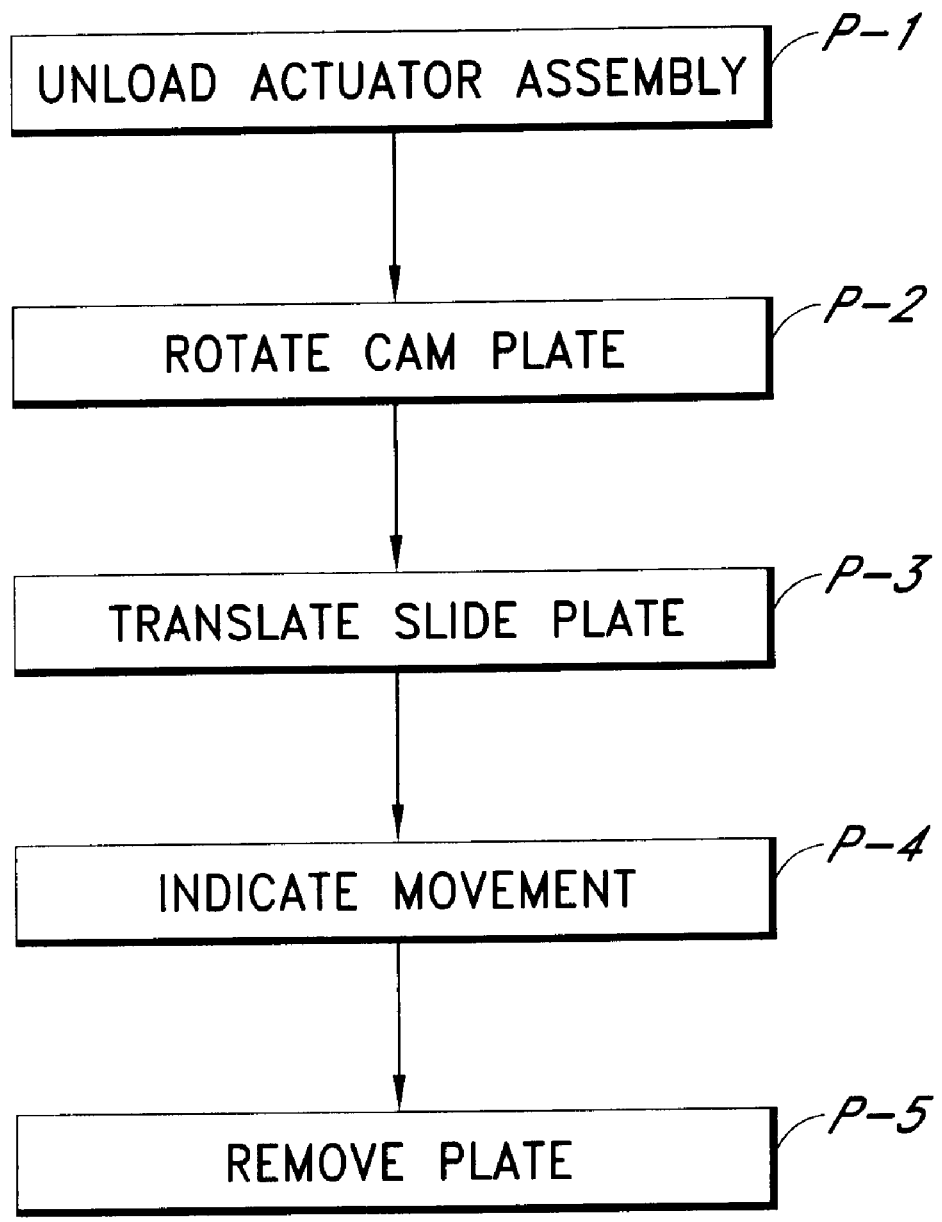
FIG. 8B is an exemplary flow chart summarizing a preferred removal process.

With reference now to FIGS. 4A, 4B, 5A and 5B, the locked and unlocked positioning of the components of the present locking plate 20 are illustrated. With reference also to FIGS. 8A and 8B, routines that can be used to locking the locking plate and to unlock the locking plate will be described.

With reference to FIG. 8A, before operation of the actuator assembly, the locking plate 20 is inserted into the open end of a pipe having a stortz-type fitting (S-1). To do so, the flanges 38 are inserted into the corresponding openings in the fitting. Once inserted, the illustrated locking plate 20 is rotated clockwise until the flanges 38 seat against a set of stops formed in the fitting. In this position, the locking plate 20 is properly placed for locking.

To lock the plate in position, the drive bolt 70 is turned in a clockwise rotation. The clockwise rotation causes the cam driver 78 to rotated in a clockwise direction as well. Simultaneously, the cam plate 74 rotates about the axis of the drive bolt 70 in a clockwise direction (S-2). The rotation of the cam plate 74 drives the latch bar 72 through the contact of the pin 96 with a wall of the slot 98 (S-3). The movement of the latch bar 72 causes one of the pins 112 to contact the pin 118. As the pin 118 is moved with the latch bar 72, the drum 56 rotates. With the latch bar 72 in the locking position, the pin 118 has driven the drum 56 sufficiently to plate the indicator pin 116 within the appropriate indicator window 57 (S-4).

Continued rotation of the drive bolt 70 axially translates the cam plate 74 along the drive bolt 70 toward the plug 32 (S-5). Movement of the cam plate 74 compresses the biasing member 77. Compressing the biasing member 77 increases the friction loading on the drive bolt 70. Accordingly, by compressing the biasing member 77, more torque is required to unlock the locking plate 20 from the stand pipe 22. Preferably, the loading is sufficient to reduce the likelihood of unauthorized removal. During the locking process, the relationship between the cam driver 78 and the cam plate 70 provides from some lost motion due to the spring loading of the pins 90. In the illustrated arrangement, the indicator pin 116 indicates that the plate 20 is locked in position before the actuator assembly is loaded with the friction load.

To unlock the locking plate 20, the drive bolt 70 is turned in a counterclockwise direction. Turning the illustrated drive bolt 70 first unloads the biasing member 77 by moving the cam plate 74 away from the plug 32 and towards the cam driver 78 (P-1). The spring-loaded pins 90 engage with the holes 86 and the rotation of the drive bolt 70 is transferred to the cam plate 74 through the cam driver 78. The cam plate 74 rotates about the drive bolt 70 (P-2). Thus, the pin 96 drives the latch bar 72 by contacting a side of the slot 98 (P-3). As the latch bar 72 moves, the other of the pins 112 contacts the other side of the pin 118. As the latch bar 72 continues to move, the pin 118 drives the drum 56 about its central axis and the indicator pin 116 is moved from one window 57 to another window 57. The movement provides a visual confirmation that the latch bar has been retracted (P-4). It is contemplated that, in some arrangements, the presence or absence of the indicator pin 116 in the window 57 can provide some visual indication of latch bar movement. Preferably, the indicator indicates that the locking plate 20 is unlocked only after the latch bar 72 is fully retracted. The locking plate 20 then can be removed (P-5).

As a redundant back-up feature, in the event that the spring loaded pins 90 fail to engage with the holes 86, continued rotation of the drive bolt 70 translates the cam plate 74 into the cam driver 78. The cam plate 74, thus, jams against the cam driver 78, which would cause the cam plate 74 to turn with the cam driver 78 with all of the rotational torque of the drive bolt 70. Accordingly, the latch bar 72 would be driven with all of the rotational torque of the drive bolt 70. This provides a fail-safe mode of operation in the event of a catastrophic failure of the actuator assembly or the torque interlock assembly Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A locking cover plate for an open pipe end having a stortz-type fitting, said cover plate comprising a housing, said housing having a front surface and a generally cylindrical side surface, an actuator assembly substantially contained within said housing, said actuator assembly comprising a drive bolt extending rearward from said front of said housing, a cam plate being connected to said drive bolt, a torque limiting assembly selectively coupling said cam plate to said drive bolt, said cam plate rotating relative to said drive bolt when coupled by said torque limiting assembly to said drive bolt and said cam plate translating relative to said bolt when not coupled by said torque limiting assembly to said drive bolt, a latch bar being connected to said cam plate and being disposed for translation generally normal to an axis that extends through said drive bolt, and an indicator assembly that is connected to said latch bar.

2. The cover plate of claim 1, where said indicator assembly comprises a drum that rotates about an axis that is generally parallel to said axis that extends through said drive bolt.

3. The cover plate of claim 2, wherein said drum comprises at least two different colors and said housing comprises an opening through which one of said colors is displayed when said latch bar is in a first position and a second of said colors is displayed when said latch bar is in a second position.

4. The cover plate of claim 1 further comprising a compressible member disposed along said drive bolt between said cam plate and a rigid member, said cam plate and said rigid member compressing said compressible member when said cam plate is not coupled by said torque limiting assembly to said drive bolt.

5. The cover plate of claim 4, wherein said drive bolt drives said cam plate toward said front surface after said latch bar moves outward.

6. The cover plate of claim 4, wherein said drive bolt drives said cam plate away from said front surface before said latch bar moves inward.

7. The cover plate of claim 4, wherein movement of said drive bolt in a first direction results in movement of said cam plate toward said front surface and movement of said latch bar outward from said side surface.

8. The cover plate of claim 4, wherein movement of said drive bolt in a first direction results in movement of said cam plate away from said front surface and movement of said latch bar inward toward said side surface.

9. A protective cover plate for a stortz connection of a piping system, said cover plate comprising a front plate, a stortz fitting extending rearward from said front plate, and a sliding plate locking mechanism being disposed rearward of said front plate and being adapted to engage a concealed portion of said piping system when said cover plate is assembled to said piping system, said sliding plate locking mechanism comprising an indicator assembly that provides visual confirmation of an operational characteristic of said sliding plate locking mechanism.

10. The cover plate of claim 9, wherein said stortz fitting and said front plate are formed separately from each other and said stortz fitting forms a portion of an adapter ring that is connected to said front plate.

11. A protective cover plate for a stortz connection of a piping system, said cover plate comprising a front plate, a stortz fitting extending rearward from said front plate, and a sliding plate locking mechanism being disposed rearward of said front plate and being adapted to engage a concealed portion of said piping system when said cover plate is assembled to said piping system, said sliding plate locking mechanism comprising a single exposed moving component when said cover plate is assembled to said piping system.

12. The cover plate of claim 11, wherein said stortz fitting and said front plate are formed separately from each other and said stortz fitting forms a portion of an adapter ring that is connected to said front plate.

13. A method of installing a cover plate to a piping system having a stortz fitting, said method comprising inserting said cover plate into said stortz fitting, rotating said cover plate to secure said cover plate to said stortz fitting, turning a cam plate, translating a latch bar, indicating a movement of said latch bar, and loading an actuator assembly with a tamper-resistant torsion load, said translating movement of said latch bar being indicated by rotational movement of an indicator drum.

14. The method of claim 13, wherein said cam plate is turned only while said cam plate is engaged with a torque limiting assembly.

* * * * *